United States Patent [19]

Froehlig

[11] 4,294,782
[45] Oct. 13, 1981

[54] METHOD FOR SUBSTANTIALLY INSTANTANEOUS LIQUID MOLDING OF AN ARTICLE

[75] Inventor: Guy M. Froehlig, Glen Cove, N.Y.

[73] Assignees: Jerome Bauer; Myron Amer, both of Mineola, N.Y.

[21] Appl. No.: 28,687

[22] Filed: Apr. 10, 1979

[51] Int. Cl.³ .................. B29D 11/00; B29D 17/00
[52] U.S. Cl. .................... 264/1.4; 264/1.6; 264/22; 264/106; 264/145; 264/219; 264/236; 425/174; 425/363
[58] Field of Search ............ 264/22, 251, 1.6, 1.4, 264/236, 73, 132, 145, 219, 25, 106; 425/174, 363

[56] References Cited

U.S. PATENT DOCUMENTS

| | | | |
|---|---|---|---|
| 2,511,024 | 6/1950 | Toulmin | 264/168 |
| 3,655,965 | 4/1972 | Icre et al. | 250/45 |
| 3,678,141 | 7/1972 | Metcalfe et al. | 264/73 |
| 3,915,609 | 10/1975 | Robinson | 425/174.6 |
| 3,930,318 | 1/1976 | Stelter et al. | 34/4 |
| 4,013,747 | 3/1977 | Hamplel | 264/73 |
| 4,042,654 | 8/1977 | Leszyk et al. | 264/22 |
| 4,112,030 | 9/1978 | Kremzow | 264/106 |
| 4,139,654 | 2/1979 | Reed | 264/22 |
| 4,144,300 | 3/1979 | Breeden | 264/22 |

FOREIGN PATENT DOCUMENTS 566795   1/1945   United Kingdom ............... 264/25

Primary Examiner—Jay H. Woo
Attorney, Agent, or Firm—Bauer & Amer

[57] ABSTRACT

A method and apparatus for substantially instantaneous liquid molding of an article utilizing a radiation curable liquid composition and a forming mold transparent to the through passage of radiation so that radiation curing of the liquid composition is effected during the molding thereof.

8 Claims, 3 Drawing Figures

METHOD FOR SUBSTANTIALLY INSTANTANEOUS LIQUID MOLDING OF AN ARTICLE

BACKGROUND OF THE INVENTION

The present invention relates to the forming of articles from liquid material that is both molded and cured to complete the article.

In the fabrication of many articles, a plastic resin or the like is molded or otherwise shaped while in a liquid or viscous state and is thereafter cured so as to harden the material and enable it to retain its molded configuration. Often, the plastic is initially heated to permit the same to be worked into its final form and the curing is thereafter effected by cooling. It is also known to utilize a construction material that is curable, as by polymerization, in response to irradiation by a beam of ultraviolet radiation or high energy electrons.

In conventional methods and apparatus for fabricating such articles, two discrete and individually identifiable steps of, first, molding or configuring the liquid material, and thence curing the same to a hardened state, are performed sequentially. For example, in the art of fabricating flexible plastic phonograph records which are often removably bound in magazines and the like for advertising or instructional purposes, a relatively thin sheet of plastic is initially heated in an oven-like environment so that the material becomes readily workable and selectively deformable. The heated plastic sheet is then conveyed or transported from the oven to a pressure mold at which the phonograph grooves are impressed onto the sheet.

Although the mold absorbs some heat from the plastic sheet and thereby aids in cooling the same, it is generally necessary to remove the sheet from the mold and convey it to a curing station where it is subjected to a cooling air flow so as to complete the hardening or curing of the plastic material. The process of flexible record fabrication is typically continuous so that the sheet of material is kept moving in assembly-line fashion from one station to the next. However, the plastic sheet must be moved at a relatively slow rate to enable the desired result to be attained at each station, and fabrication time for a completed article is consequently uneconomically lengthy. Continuous operation of the necessary heating and cooling apparatus also uses a significant amount of energy which contributes to relatively high article fabrication costs.

A further disadvantage of the known method is inherent in the movement of the article between the molding and curing stations. Since the construction material is still in an essentially liquid state after molding and prior to curing or hardening, the liquid material flows and undergoes varying amounts of distortion from its molded configuration as it is moved between the two stations. The amount of distortion which occurs generally depends upon the viscosity of the material and the nature or form of the molded article. Particularly in the fabrication of phonograph records, in which the precise depth and shape of the grooves determine the accuracy with which the stored information or sound can be reproduced, any deformation or distortion of the groove pattern initially impressed on the plastic sheet prior to curing is most undesirable. Yet, distortion is for the most part unavoidable in presently known methods of fabrication irrespective of whether the material is first heated and then cured by cooling, or is instead molded in a cool liquid state utilizing a radiation-curable material and thereafter hardened by irradiating the preconfigured liquid material.

It is, therefore, the desideratum of the present invention to provide a method and apparatus for the production of molded articles from a liquid material by which the articles can be fabricated at a relatively rapid rate with a minimum expenditure of energy while eliminating undesired distortion or deformation of the configuration imparted to the liquid material in the molding operation prior to curing or hardening thereof.

In particular, it is an object of the present invention to provide a method and apparatus for substantially instantaneous liquid molding of an article.

It is another object of the invention to provide a method and apparatus for substantially instantaneous molding and curing of a liquid material in the fabrication of an article therefrom.

A further object of the invention is the provision of a method and apparatus for substantially instantaneous liquid molding of articles on a continuous web of base material.

Further objects, features and advantages of the present invention will be more fully appreciated by reference to the following detailed description of presently preferred, but nonetheless illustrative, embodiments in accordance with the present invention, when taken in conjunction with the accompanying drawings, wherein.

DETAILED DESCRIPTION OF PREFERRED EMBODIMENTS

The present inventive disclosure teaches the method and apparatus for substantially instantaneous liquid molding in which fabrication of an article from a liquid composition is effected by substantially simultaneously molding and curing the article so as to reduce production time and costs and substantially eliminate distortion or deformation of the molded configuration of the article prior to the completion of curing or hardening of the liquid composition. This novel teaching is practiced by utilizing a liquid composition curable in response to radiant energy directed thereon and a mold or an equivalent patterning, or forming, or configuring means which is transparent to the curing radiation so that hardening of the composition may be effected during the molding operation and while the article remains in the forming mold. Several exemplary applications of the inventive concept will be described to demonstrate the many practical uses therefor although those skilled in the art will readily recognize that the present invention has wide ranging possibilities not limited by the particular applications set forth herein.

Figure 1:
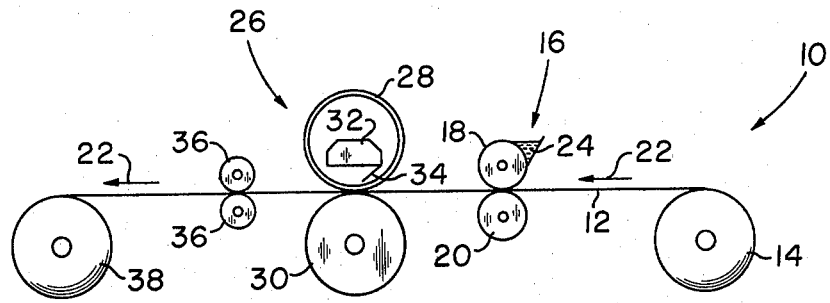
FIG. 1 is a diagrammatic view of an apparatus in accordance with the teaching of the present invention for the production of coated wallpaper.

There is seen in FIG. 1 an apparatus, designated by the general reference numeral 10, for the production of coated wallpaper having either a smooth coating or a raised-pattern arrangement on its surface. The apparatus 10 can, of course, be utilized to coat a continuous web of base material for any desired application or end use, and the discussion of wallpaper as the product produced is intended to be solely for purposes of illustration and is not to be limiting upon the scope of the invention.

A continuous web of base material 12 which may be preprinted or patterned or tinted as desired is unwound from a freewheeling feed roll 14 and fed to a coating station generally designated 16 where a relatively thin film of the liquid coating composition is applied to the base material 12. As previously indicated, the liquid composition is curable in response to radiant energy direct thereon and may comprise a plastic monomer which is polymerizable in response to a relatively short burst or application of ultraviolet radiation.

Although the apparatus 10, and those additional exemplary applications hereinafter described, will for purposes of discussion assume the use of a liquid composition polymerizable or curable by ultraviolet radiation, it should be understood that the choice of such composition, its inherent properties such as viscosity and flexibility after hardening, and the band or wave length of radiation by which the same is curable, are not critical to the practice or concept of the present invention. While it is preferred that the composition be radiation-curable at a relatively rapid rate, curing of the composition to a solid or hardened material may, depending upon the composition utilized, be effected utilizing ultraviolet radiation or high energy electrons or any other emissions which bring about the desired result.

At the coating station 16, the web of material 12 is directed between an applicator drum or roller 18 and an idler or pressure roller 20 normally urged against the drum 18. The applicator drum 18 is rotatably driven by any conventional means at a rate appropriate to advance the web 12 at the desired speed in the direction indicator by the reference arrow 22. Rotation of the drum 18 also serves to move its peripheral surface through or otherwise into communication with the contents of a reservoir or bath 24 of the radiation-curable liquid composition. The drum surface is thereby coated with the liquid composition as the applicator drum 18 rotates through the bath 24 and the coating liquid is transferred to or deposited on the web of base material 12 as the same moves into driven contact with the applicator 18. The idler roller 20 merely serves to maintain the web 12 engagingly against the driven applicator drum 18 so as to assure continued forward movement or advance of the web of material and facilitate the transfer of liquid composition onto its surface.

Continued advance of the web of base material 12 next carries it to a molding and curing station designated 26. At the station 26, a molding means in the form of a cylinder 28 is rotatably driven against a cooperating idler roller 30 normally urged into surface contact against the periphery of the cylinder 28. The base material 12 is directed into the nip defined by the juncture of the cylinder 28 and cooperating idler roller 30 whereby the liquid composition deposited on the web is forced into contact with and against the peripheral surface of the molding cylinder 28.

Depending upon the nature or design of the peripheral surface of the cylinder 28, the film of liquid composition will be imprinted or impressed in a manner conforming to the cylinder's surface as the idler or pressure roller 30 urges the base material 12 into molding contact therewith. Thus, the provision of a selected pattern or stripling etched into the surface of the cylinder 28 will predeterminately configure the liquid composition with a raised arrangement of the etched pattern or stipling. On the other hand, if merely a smooth coating of the liquid composition on the base material 12 is desired, the surface of the cylinder 12 might be of polished or unwrinkled form.

The molding cylinder 28 may be provided as a hollow member or may instead include an internally defined cavity therein. A source 32 of radiation is positioned within the hollow interior or cavity of the cylinder 28, or at least so that an emitted beam of radiant energy emanates from within the interior of the cylinder 28 and, for purposes of description, the source 32 will be herein considered to emit a beam of ultraviolet frequency. In order to enable the ultraviolet beam emitted by the source 32 to radiate outwardly from the interior of the cylinder 28 and upon the web of base material 12, the cylinder 28 is formed of a material transparent to the throughpassage of ultraviolet radiation. Thus, the molding member 28 may, by way of example, comprise a glass cylinder into which the preselected pattern to be imparted to the web-carried liquid composition is etched.

As the web of base material 12 carrying a film of radiation-curable liquid composition is advanced into contact with the surface of the molding cylinder 28, the etched pattern on the cylinder 28 is pressed against the liquid composition and its predetermined configuration is imparted thereto. Substantially simultaneously with the configuring of the liquid composition, the radiant emissions emanated by the radiation source 32 and freely passing through the cylinder 28 strike the web-carried liquid composition and substantially instantaneously cure or harden the same as so configured.

Thus, curing or hardening of the liquid composition deposted on the moving web of base material 12 will take place substantially simultaneous with the molding of the liquid composition as it contacts the peripheral surface of the cylinder 28. As a result, there is virtually no possibility of deformation or distortion of the pattern impressed upon the liquid composition prior to curing of the same since the molding and curing operations are performed in what is essentially a single step. Put another way, hardening of the liquid composition is actually effected during the molding process, and as a consequence even if an extremely low viscosity liquid is utilized for coating or patterning the base material 12, the exact predetermined configuration desired and expected will be achieved.

Clearly, the alignment of the source 32 of radiant energy relative to the point of contact of the molding cylinder 28 and base material 12 is critical since radiant emissions impinging upon the web-carried liquid composition prior to the point of molding contact is likely to cause premature hardening and interfere with and alter the predictability or accuracy of the pattern imparted thereto by the cylinder 28. Thus, a barn-door type radiation-shielding guide member 34 may be utilized in conjunction with the radiation source 32 to direct the radiant energy emissions and prevent their impinging upon the liquid composition prior to contact with the surface of the cylinder 28. Of course, the same result could be achieved by utilizing a radiation source 32 capable of emitting a narrow and directed beam of energy to the precise area required.

After the substantially simultaneous molding and curing of the liquid composition at the station 26, which has the further effect of permanently and unitarily bonding the composition of the supporting base material 12, the web may be directed through a pair of rotatively driven guide rollers 36 and onto the take-up roll 38. A relatively rapid rate of advance or movement of the web 12 through the apparatus 10 is possible since the molding and curing step or operation at the station 26 is performed substantially instantaneously whereby subsequent distortion or deformation of the pattern imparted to the liquid composition is not possible. As a consequence, the passage of the web 12 through the guide rollers 36 and onto the take-up roll 38 will not artificially distort or change the configuration or pattern in which the composition has been substantially simultaneously molded and cured.

Figure 2:
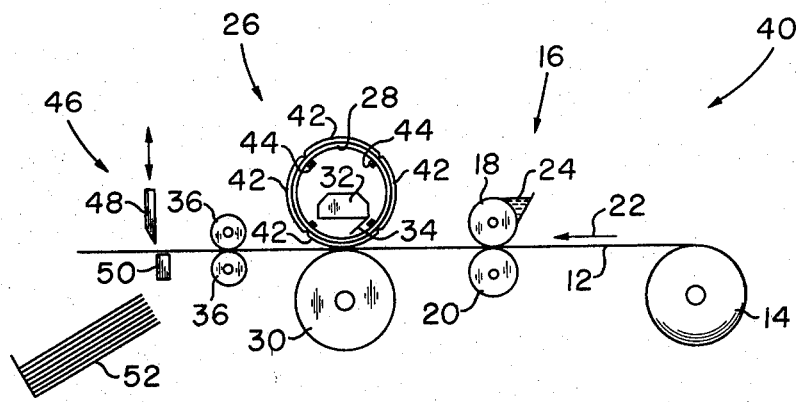
FIG. 2 is a diagrammatic view of an apparatus for the fabrication of phonograph records in accordance with the present invention for the fabrication of phonograph records.

FIG. 2 illustrates an apparatus, designated by the general reference numeral 40, for the fabrication of relatively flexible phonograph records which may, in use, be removably bound in magazines and the like for promotional or instructional purposes. In many respects, certain elements of the apparatus 40 are identical with corresponding elements of the wallpaper-fabricating apparatus 10 seen in FIG. 1 and previously discussed above. In order to avoid repetition, detailed discussion of these identical elements is omitted and the same reference numeral has been used to identify the comparable elements in FIGS. 1 and 2.

The web of base material 12 utilized in connection with the apparatus 40 is intended to serve as a support or substrate and may comprise a continuous web of heavy paper or card stock. The base material 12 may be preprinted or colored as with a design such that if a clear or substantially transparent liquid composition is employed in practicing the invention, such printing or colored design will be visible through the grooves formed on the completed record.

A film of the radiation-curable liquid composition is initially deposited on the base material 12 at the coating station 16 in a manner identical to that described in connection with the apparatus 10 of FIG. 1. It might, however, be noted that in fabricating a phonograph record it may be necessary or advantageous to deposit a somewhat thicker film of the liquid composition in which the record grooves are formed than that imparted to the base material in the production of coated wallpaper.

In the apparatus 10 for providing a raised-pattern or coating on wallpaper, it was desired to impart a repeating predetermined configuration to the liquid composition so as to form a continuous web or roll of coated wallpaper material. In the present method of fabricating phonograph records, on the other hand, a plurality of discrete articles—i.e. individual records—are being manufactured on a continuous web of base material such that the individual articles are initially connected along the length of the web and may be subsequently detached or separated from one another. Thus, instead of providing a continuous etched surface on the molding cylinder 28, it is necessary to define along the peripheral surface of the cylinder 28 a series of separate and individually-complete groove-molding or forming areas, each capable of imparting to the liquid material an entire groove pattern for a single, one-sided phonograph record. Of course, the molding cylinder 28 could be predeterminately sized circumferentially so as to reproduce a single phonograph record with each rotation thereof, but for purposes of this description it will be assumed that the circumference of the cylinder 28 is sufficient to produce some multiple number of individual articles.

As a consequence, a plurality of groove-forming molds 42 are seen in FIG. 2 secured about the outer periphery of the cylinder 28, as for example with a bolt or pin attachment means 44. The cylinder 28, as that shown in FIG. 1, is again formed of a material transparent to the through passage of the frequency or band of radiation required for curing, as for example ultraviolet emissions, and of course each of the groove-forming molds 42 must likewise be transparent to the radiant energy emitted by the source 32. Accordingly, the molds 42 may be conveniently described and referred to as window molds since in addition to imparting the predetermined configuration or groove patterns to the film of liquid composition deposited on the base material 12, the molds 42 also have "windows" transparent to the radiant energy emitted by the internally-emanating source 32 and through which the same is permitted to pass outwardly from the interior of the cylinder 28 to cure or harden the liquid composition at the same time as or substantially simultaneously with the predeterminately-groove configuring thereof.

Thus, as the cylinder 28 is rotated so as to bring one of the window molds 42 into contact with the film of liquid composition on the advancing web 12, the predetermined groove pattern is impressed into the liquid composition. At the same time, the radiant emissions from the internally-position radiation source 32 pass through the cylinder 28 and overlayed window mold 42, both of which are transparent to such emissions, and impinge upon the liquid composition in which the grooved arrangement is being impressed. The formation of the grooved pattern in and the curing or hardening of the liquid material is substantially simultaneously performed and distortion or deformation of such pattern is prevented. In other words, the grooved pattern in the liquid material is hardened while the forming mold surface remains in contact therewith even though both the molding cylinder 28 and the web of base material 12 are constantly in motion.

The use of individual or discrete groove-forming window molds 42 secured about the periphery of the cylinder 28 facilitates interchangeability of the molds 42 so that the groove pattern imparted to the film of liquid composition on the base material 12 may be easily altered or the mold 42 simply replaced when significant wear or degradation has occurred. The arrangement shown also enables the simultaneous fabrication of individual phonograph records having different groove patterns on the same roller, and consequently along the same web of material 12, since there is no necessity that each of the window molds 42 impart the same configuration or groove pattern to the film of liquid composition. It is, however, within the contemplation of the invention to provide the groove-forming window molds 42 integral with the cylinder 28 as a single molding element and accordingly the structural arrangement shown in FIG. 2 is not meant to constitute a limitation on the scope of the invention.

Following substantially instantaneous molding and curing of the plural phonograph records attachedly spaced along the length of the web, the base material 12 is directed through guide rollers 36 and thence to a cutting station designated 46. A cutting blade 48 is reciprocally moved relative to a cutting guide 50 at selected time intervals so as to cut the continuous web of base material 12 into discrete portions, each of which constitutes a separate or individual phonograph record. The records so separated from the remainder of the web drop or are otherwise conveyed to a collection bin 52 for temporary storage.

Figure 3:
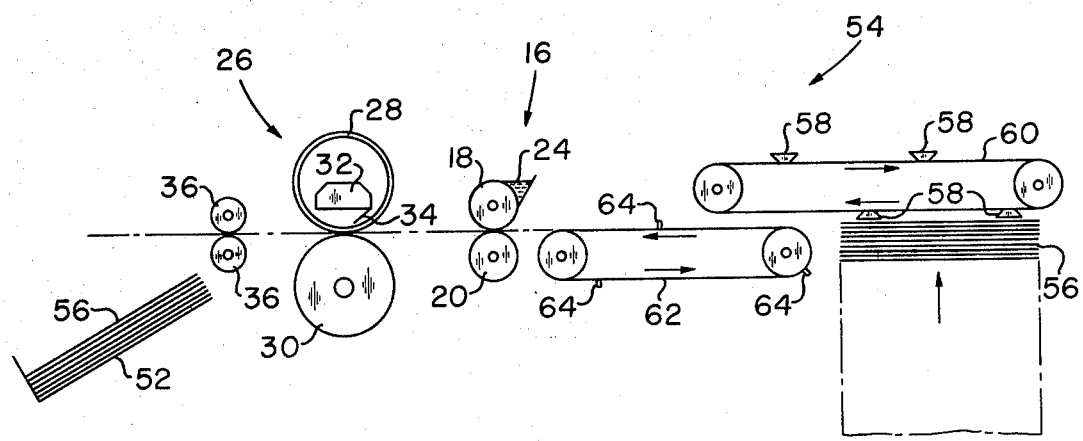
FIG. 3 is a diagrammatic view of an apparatus in accordance with the present invention for providing a patterned coating on individual panels.

FIG. 3 illustrates an apparatus generally designated 54 for providing a grained pattern on wall panels or the like. The apparatus 54 most closely resembles that described in connection with FIG. 1 with the exception of the initial transport mechanism by which the individual panels are moved or advanced to the coating station 16. As a consequence, details of the remainder of the apparatus 54 will be omitted from the following description so as to avoid unnecessary repetition.

The panels, individually and collectively designated 56, are initially stacked one atop the other and an upwardly directed force is applied under the pile of panels 56 so as to urge the topmost panel against an engaging means 58. As seen in FIG. 3, the engaging means comprises suction-type elements carried on a conventionally driven transport belt or conveyor 60. In a manner well understood by those skilled in the art, the suction elements 58 engage the topmost panel 56 and advance the same to a second belt-type driven conveyor 62 which carries upwardly depending pusher tabs 64 at predetermined intervals therealong. As the conveyor 60 advances each panel 56 from the stack of panels the pusher tabs 64 engage behind the panel and carry or direct the same to the coating station 16. Since the applicator drum 18 is individually driven, as are the molding cylinder 28 and guide rollers 36, once each panel 56 is directed into engagement with the coating station 16 its forward movement or advance continues under the power of each succeeding station through which the same is moved. After substantially simultaneous molding and curing at the station 26, the panels 56 are collected in a bin 52 for temporary storage therein. Thus, in the same manner as that described with respect to the apparatus of FIGS. 1 and 2, a grained pattern conforming to the etched configuration of the molding cylinder 28 is substantially simultaneously imparted to and cured or hardened on the panels 56 in an essentially single step operation.

There has, therefore, been described a method and apparatus for substantially simultaneous liquid molding of an article whereby molding and curing of a coating on a substrate material are substantially simultaneously performed in a single-step operation. This result is achieved by utilizing a liquid composition curable in response to radiant energy directed thereon, and by further providing a mold or configuring element transparent to the through-passage of the curing radiant energy such that curing or hardening of the liquid composition is accomplished during or substantially simultaneous with the molding or configuring of the article. In the embodiments shown and described, a source of radiant energy is provided internally or within the molding element although the present invention contemplates the placement of the radiation source externally of the mold so that the radiant energy is required to pass completely therethrough for curing of the liquid composition.

Furthermore, there is no intention to restrict the scope of the present invention to the particular uses or apparatus shown and described herein. The method of the present invention is equally applicable where it is desired to form a liquid molded article removably on a base material or support to which the liquid molding composition will not bond or separately from and independently of any base material.

Thus, by way of example, a "soft" contact lens or other thin precision part can be substantially instantaneously molded utilizing the method of the present invention by pouring a quantity of the liquid composition into a mold cavity and closing the cavity with a second correspondingly mating mold element. At least one of the mold elements utilized would include at least a "window" transparent to the passage of radiant energy necessary for curing the liquid composition. In this manner, the liquid composition may be shaped or molded to a particular configuration or structure and then rapidly cured using incident radiant energy while still within the mold cavity. The mold, of course, is not intended to perform per se any function in the curing of the liquid composition; rather, its sole purpose is to generate or create the design in or the shape of the liquid composition which is substantially simultaneously irradiated through the mold whereby the molding composition is substantially instantaneously cured or hardened to the molded shape.

The invention is unusually unique in that it does not depend upon or require the molding material to be of any specific viscosity and one of the novel features of the invention resides in the ability to impart to this molding material a desired pattern or configuration regardless of the viscosity of the material. It is important to recognize this aspect of the invention because substantially instantaneously with the application of the pattern or desired end configuration to the molding material the same is cured or hardened. Thus, were the curing operation to be performed in a separate sequence or step from that of patterning the molding material, the pattern imparted to the material could change even if the interval between the separate or sequential molding and curing steps were made as short as possible. As a consequence, it will be recognized that the present invention teaches a very simple and highly yet efficient method and apparatus for forming a molded article by configuring a liquid material and at the same time curing the material all in a single step operation.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A method of producing an article by substantially instantaneous liquid molding comprising:

depositing a film of radiation-curable liquid material onto a support, applying a radiation-transparent molding element to the film of liquid material to predeterminately configure the material by impressing it to the form of the article to be produced, and irradiating the film of material with a source of radiation transmitted through the radiation-transparent molding element during said forming application of the molding element to the material so as to effect substantially instantaneous curing of the material and complete the production of the article in an essentially single-step molding and curing operation.

2. In the method according to claim 1,
providing a continuous web of base material to serve as the support upon which the film of liquid material is deposited and to which the liquid material bonds when irradiated with the source of radiation to form an integral article of the base material and the cured liquid material deposited thereon.

3. In the method according to claim 2,
cutting the continuous web into discrete portions which include the cured liquid material unitarily bonded to the base material so as to form a plurality of articles produced through substantially instantaneous liquid molding.

4. In the method according to claim 1,
said irradiating of the deposited film of material being performed using a source of ultraviolet radiation transmitted through the radiation-transparent molding element during its application to the film of material for substantially instantaneous curing of the material.

5. In the method according to claim 1,
positioning the source of radiation to emanate from within an interior cavity of the radiation-transparent molding element so that radiation emitted by the source of radiation passes through the molding element from its interior to its exterior for irradiating the film of material.

6. In a method of fabricating a phonograph record,
applying a film of radiation-curable liquid composition to a base material to which the liquid composition to a base material to which the liquid composition is unitarily bondable,
moving a mold into forming contact with the film of liquid composition applied to the base material so as to impress upon the liquid composition a predetermined configuration of phonograph-readable grooves,
and irradiating the predeterminately configured liquid composition with a source of radiation directed through the mold during its forming contact with the film of liquid composition to cure and harden the liquid composition substantially simultaneous with the predeterminate configuring thereof so as to prevent distortion of the grooves impressed upon the liquid composition before the same is cured to complete the fabrication of the phonograph record.

7. In a method of substantially instantaneous liquid molding of an article,
depositing a radiation-curable liquid composition on a base material,
moving the base material and deposited liquid composition into contact with a radiation-transparent molding element for impressing a predetermined configuration conforming to that of the article on the deposited liquid composition,
and irradiating the deposited liquid composition with a beam of radiation passing through the radiation-transparent molding element from a source of radiation positioned in the interior thereof during contact of the molding element with the deposited liquid composition so as to substantially simultaneously configure and cure the deposited liquid composition in a single-step operation and thereby form the article.

8. In a method according to claim 7,
wherein the molding element comprises a roller having an outer periphery including configuring means for impressing said predetermined configuration on the deposited liquid composition and window means transparent to the through-passage or radiation and communicating with the internally-positioned source of radiation,
rotating the roller so that as the liquid composition deposited on the base material is moved into contact with the outer periphery of the roller, said configuring means is rotated into configuring contact with the liquid composition substantially simultaneously with its irradiation by a beam of radiation passing through the window means of the rotating roller.

* * * * *

UNITED STATES PATENT AND TRADEMARK OFFICE
CERTIFICATE OF CORRECTION

PATENT NO. : 4,294,782
DATED : October 13, 1981
INVENTOR(S) : GUY M. FROEHLIG

It is certified that error appears in the above-identified patent and that said Letters Patent are hereby corrected as shown below:

Claim 6, line 4, delete "tion to a base material to which the liquid composi-"

Signed and Sealed this

Twenty-second Day of December 1981

[SEAL]

Attest:

GERALD J. MOSSINGHOFF

Attesting Officer     Commissioner of Patents and Trademarks